(12) United States Patent
Bartholmae

(10) Patent No.: US 8,702,307 B2
(45) Date of Patent: Apr. 22, 2014

(54) METHOD FOR DETERMINING INTERNAL LCD TEMPERATURE

(75) Inventor: Jack Bartholmae, Duluth, GA (US)

(73) Assignee: American Panel Corporation, Alpharetta, GA (US)

( * ) Notice: Subject to any disclaimer, the term of this patent is extended or adjusted under 35 U.S.C. 154(b) by 517 days.

(21) Appl. No.: 12/205,499

(22) Filed: Sep. 5, 2008

(65) Prior Publication Data

US 2010/0061423 A1 Mar. 11, 2010

(51) Int. Cl.
*G01K 7/00* (2006.01)

(52) U.S. Cl.
USPC .......................................... 374/183; 374/141

(58) Field of Classification Search
USPC ................................. 374/141, 183
See application file for complete search history.

(56) References Cited

U.S. PATENT DOCUMENTS

| | | | | |
|---|---|---|---|---|
| 5,694,147 A | * | 12/1997 | Gaalema et al. | 345/101 |
| 5,744,819 A | * | 4/1998 | Yamamoto et al. | 257/59 |
| 6,089,751 A | * | 7/2000 | Conover et al. | 374/183 |
| 6,309,100 B1 | * | 10/2001 | Lutnaes | 374/183 |
| 6,414,740 B1 | | 7/2002 | Hosoyamada | |
| 6,723,958 B2 | | 4/2004 | Brandt et al. | |
| 6,885,412 B2 | * | 4/2005 | Ohnishi et al. | 349/72 |
| 2002/0089638 A1 | * | 7/2002 | Ho et al. | 349/161 |
| 2005/0093812 A1 | * | 5/2005 | Lee et al. | 345/101 |
| 2005/0285986 A1 | * | 12/2005 | Kim et al. | 349/42 |
| 2007/0012897 A1 | * | 1/2007 | Lee et al. | 252/299.1 |
| 2010/0271570 A1 | * | 10/2010 | Dunn | 349/72 |
| 2012/0154706 A1 | * | 6/2012 | Cho et al. | 349/58 |

* cited by examiner

*Primary Examiner* — Mirellys Jagan
(74) *Attorney, Agent, or Firm* — Standley Law Group LLP

(57) ABSTRACT

Embodiments include a system and method for determining the temperature of the liquid crystal layer of a liquid crystal display. Because LCD performance is dependant on the temperature of the liquid crystal layer, performing particularly poorly in colder temperatures many LCD's are available with integral heaters. Determining the temperature of the liquid crystal layer of an LCD is imperative for appropriate thermal management, which in turn leads to more-optimal LCD lifetime. Exemplary embodiments relate to accurately determining the temperature of the liquid crystal layer of an LCD by employing the integrated heater layer as a temperature sensor. When the relationship between the temperature of the integral heater is known, and the integral heater is disposed very near the liquid crystal layer, then determining the resistance of the metal heater layer, allows for rapid, accurate determination of the average temperature of the liquid crystal layer, and correspondingly better thermal management.

18 Claims, 3 Drawing Sheets

METHOD FOR DETERMINING INTERNAL LCD TEMPERATURE

CROSS-REFERENCE TO RELATED APPLICATIONS

This application does not claim priority to any co-pending applications.

TECHNICAL FIELD

This invention relates generally to temperature determination, and more specifically to determining the internal temperature of a liquid crystal matrix in a liquid crystal display (LCD).

BACKGROUND ART

There is growing market demand for LCD's including demand for their use in outdoor environments. The use of LCD's in outdoor environments entails exposing the displays to temperatures that may be significantly above or below optimal for LCD performance.

Liquid crystals are characterized by their ability to change their optical properties in response to applied electromagnetic fields. This has made them ideal for displaying information that changes periodically, such as in liquid crystal displays. This ability is affected by the temperature of the liquid crystals, which is in turn dependant upon a number of factors, such as air temperature, absorbed radiation from the sun, and heat generated by electronic equipment in the vicinity of the display etc. The effects of varying LCD temperature is especially pronounced when the optical state of the liquid crystals is determined by a low-voltage multiplexing technique, since this puts high requirements on the flexibility of the crystals.

A LCD's performance is temperature-dependant, and in particular, performs poorly at low temperatures. In an effort to counter this; integral heaters have been provided in LCD devices to raise the temperature of the LCD to achieve satisfactory performance. The heaters generally include LCD temperature sensors often connected to a microprocessor which controls a switch to modulate the heating implement and maintain the LCD at a satisfactory operating temperature.

Liquid crystal displays do not operate well at low temperatures. At temperatures of approximately −20 degrees C. and below, the LCD fluid becomes too viscous to respond to an applied electric potential within an acceptable time. Because it is the fluid in the LCD and not the remainder of the device that must be heated during low temperature operation, LCD's can be procured with integral heater elements.

In the vast majority of displays the temperature sensor is located on one side of the LCD, most likely outside of the viewable area of the LCD. In this arrangement the sensor detects temperatures that while they are similar to that of the liquid crystals, there is room for improvement. While this phenomenon is most likely due to thermal coupling with metal in the display assembly, this offset appears to vary from finished assembly to finished assembly, and thus is difficult to account for in manufacture.

If the temperature sensor does not accurately reflect the temperature of the liquid crystal, the resulting heating of the display will be suboptimal. Slow heating or failure to reach a threshold temperature can cause the LCD to operate in an unacceptable fashion, as the liquid crystal fluid will be too viscous to respond suitably to applied currents. Conversely, if the heating progresses beyond desired temperatures the operation and lifetime of the display are compromised.

It is therefore desirable to determine as close as possible the actual temperature of the liquid crystal matrix, if the temperature is not determined accurately, the temperature compensation system (for example a switch to turn off an integral metal heater layer) will not function optimally.

SUMMARY OF THE INVENTION

Many modern electronic displays that utilize liquid crystals have a heater layer, the heater layer may be disposed between the plates of glass that define the LCD stack, may be integral to one of the functional layers of the LCD stack, or may be placed behind or in front of the display (if optically transparent). These heater layers are composed of conductive materials such as metals, or alloys such as Indium Tin Oxide (ITO). The layers are often thin films or grids of the chosen material. The relationship between the temperature and the electrical resistance is a very nearly linear relationship. Thus if the slope of the line correlating the resistance and the temperature is found and if a resistance value is determined at a known temperature (for example at the time of manufacture), future temperature values may be derived from electrical resistance measurements.

If the metal heater layer is disposed very near to the liquid crystal layer, the temperature of the metal heater layer will closely resemble the real-time temperature of the liquid crystal. Thus, if the resistance of the metal heater layer is then determined, and the temperature correlated there from, this value will closely reflect the actual temperature of the liquid crystal layer, and allow for quick and accurate temperature measurement. This value may be used by a control mechanism (e.g. a switch) to engage or disengage an integral metal heater layer.

Accordingly, it is an object of at least one exemplary embodiment to accurately detect the temperature of liquid-crystal layer in a liquid crystal display, and achieve proper temperature compensation.

It is an object of at least one exemplary embodiment to reduce the number of components in a liquid-crystal display panel and assembly steps, and achieve a reduction in size and weight of a liquid-crystal display panel. This may be accomplished by using the metal heater layer as a surrogate temperature sensor—obviating the need for that component.

An object of at least one exemplary embodiment is to accurately detect the temperature of a liquid-crystal display panel, and to perform appropriate temperature compensation in response to a temperature change, thereby achieving an improvement in display performance.

In an embodiment of the present invention, a metal heater layer, the relationship between the electrical resistance and the temperature of which is known, is disposed very near the liquid crystal layer of a LCD. The electrical resistance of this metal heater layer is measured at the time of manufacture, is correlated to the temperature at the time of manufacture, and this value may be stored in non-volatile memory. The electrical resistance of the metal heater layer may then be measured during operation of the device. This value is then used to determine the temperature of the liquid crystal layer using the predetermined correlation. This more-accurate determination of the temperature of the liquid crystal may allow the thermal management system of the LCD to compensate appropriately, by either switching off the metal heater layer voltage (if the temperature is above some predetermined threshold) or by leaving the metal heater layer voltage on to heat the liquid crystal layer until subsequent temperature measurements indicate that the temperature threshold has been met.

The heater layers described in this application may consist of many different materials and configurations and may be employed in or incorporated into systems such as those described in U.S. Pat. Nos. 7,265,809, 7,292,291, 7,324,176 and U.S. Pat. application Ser. Nos. 61/041,752, 10/679,977, 11/849,065, 11/057,888 which are hereby incorporated by reference as if recited respectively in their entirety.

BRIEF DESCRIPTION OF THE DRAWINGS

A better understanding of an exemplary embodiment will be obtained from a reading of the following detailed description and the accompanying drawings wherein identical reference characters refer to identical parts and in which.

DESCRIPTION

Figure 1:
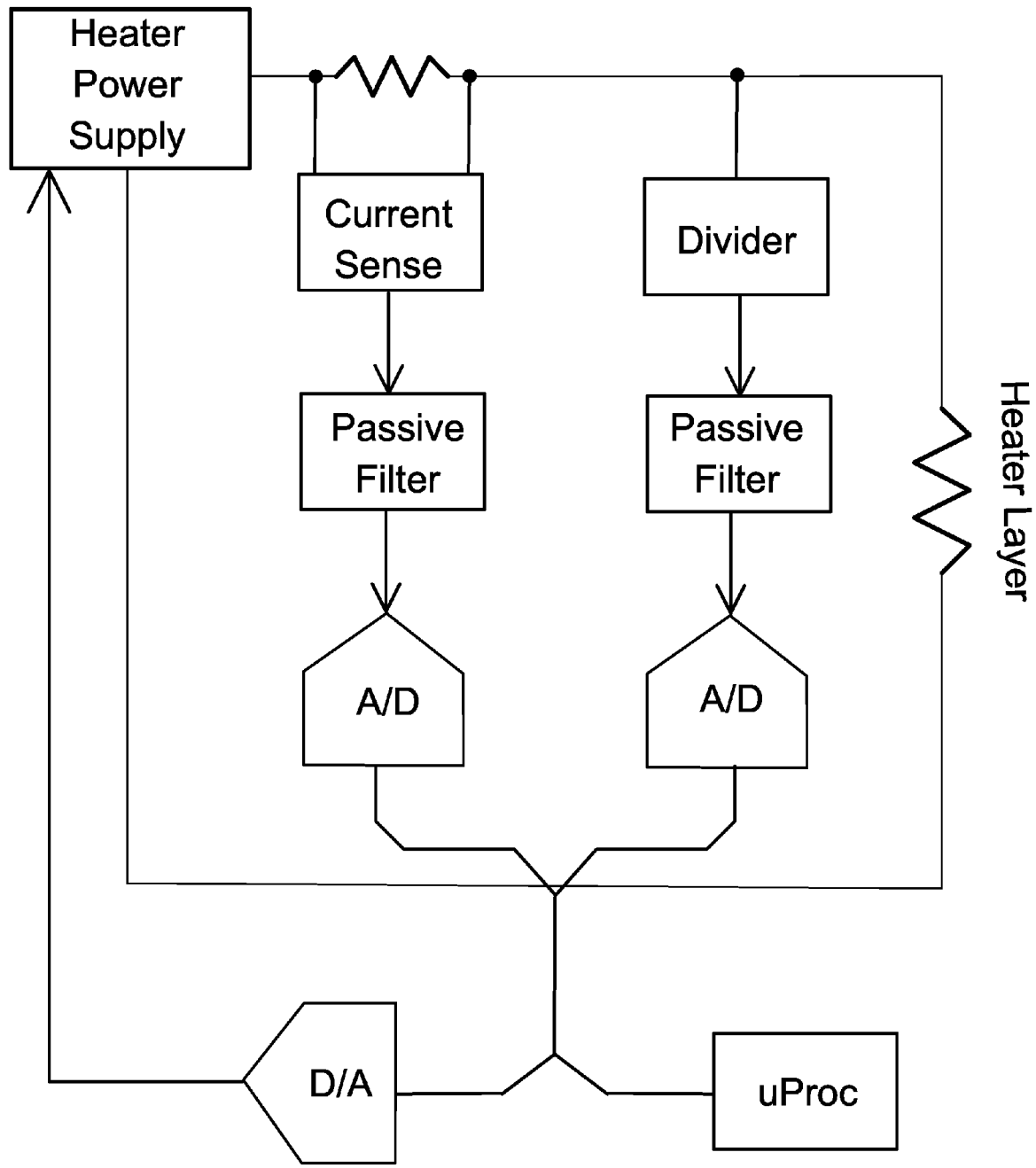
FIG. 1 is an exemplary embodiment of the circuitry and components that may be used to implement exemplary embodiments.

The block diagram of FIG. 1 illustrates an embodiment of the present temperature detection system. The Heater Power supply directs current to the Heater Layer. The digital to analog converter (D/A) is optional, as it may be replaced by a simple digital control (switch) to allow the uProc to turn the Heater Power Supply on and off. The D/A allows additional control of the Heater Power Supply output voltage or display systems that require the Heater Power Supply output voltage to be slowly turned on and off.

The Current Sense module is an application specific integrated circuit (ASIC) that measures the current supplied by the Heater Power Supply and produces a voltage that is proportional to the amount of current flowing, the larger the current flow, the larger the output voltage of the Current Sense module. After being filtered by an optional Passive Filter to remove unwanted noise, the Current Sense module output voltage is available for sampling and digitization by the A/D converter.

The Resistive Divider performs a simple voltage reduction of a known ratio to make the relatively high Heater Supply voltage compatible with the acceptable input range of the A/D converter. After filtering by an optional Passive Filter, the scaled Heater Supply Voltage is available for digitization by the A/D converter and subsequent processing at the uProc.

Figure 2:
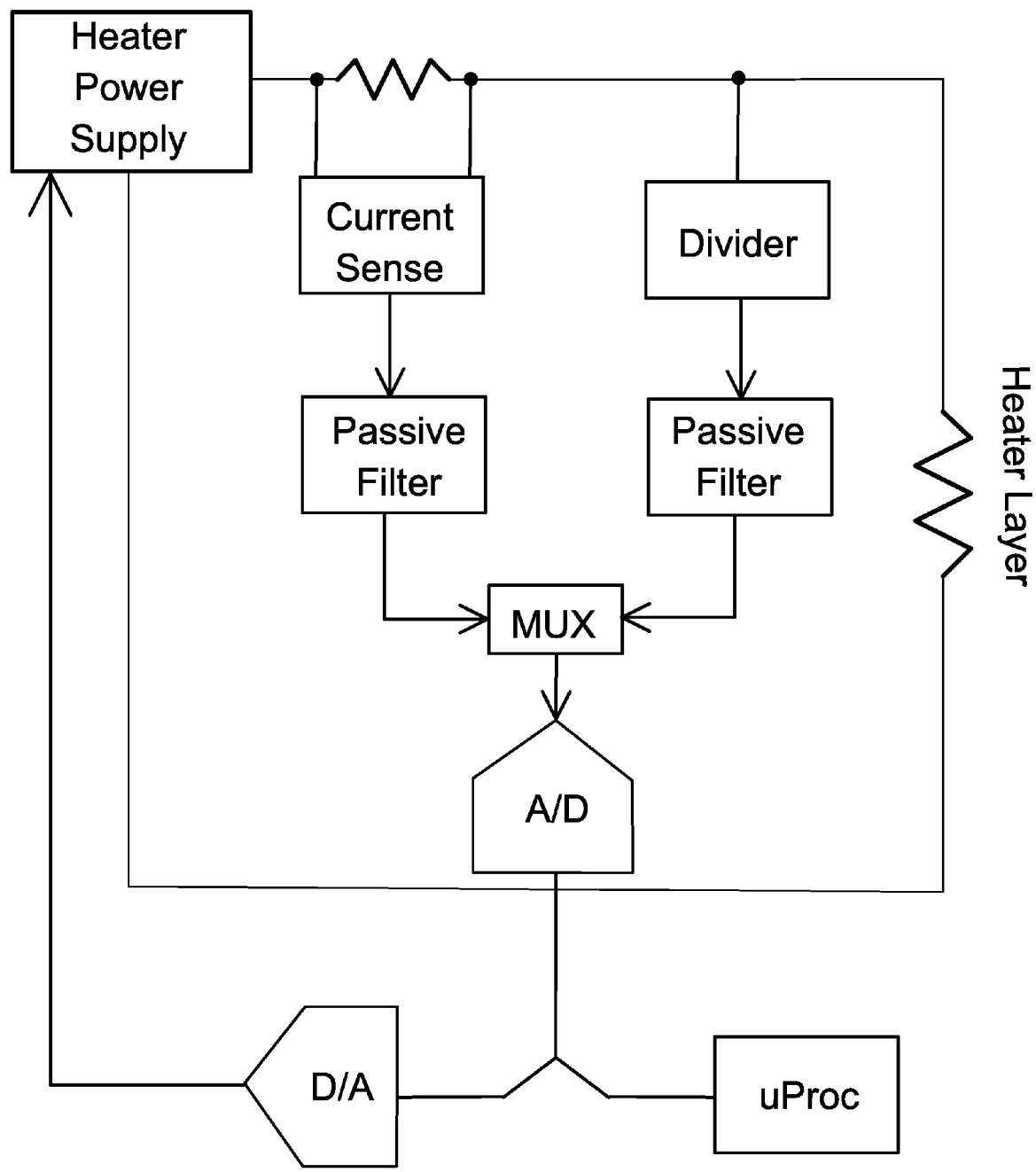
FIG. 2 is an alternative embodiment employing a multiplexer and one analog to digital converter.

The flow diagram of FIG. 2 illustrates an embodiment of the present invention. The diagram demonstrates the control sequence of an algorithm that may be used to implement this embodiment as part of an LCD heater system.

Figure 3:
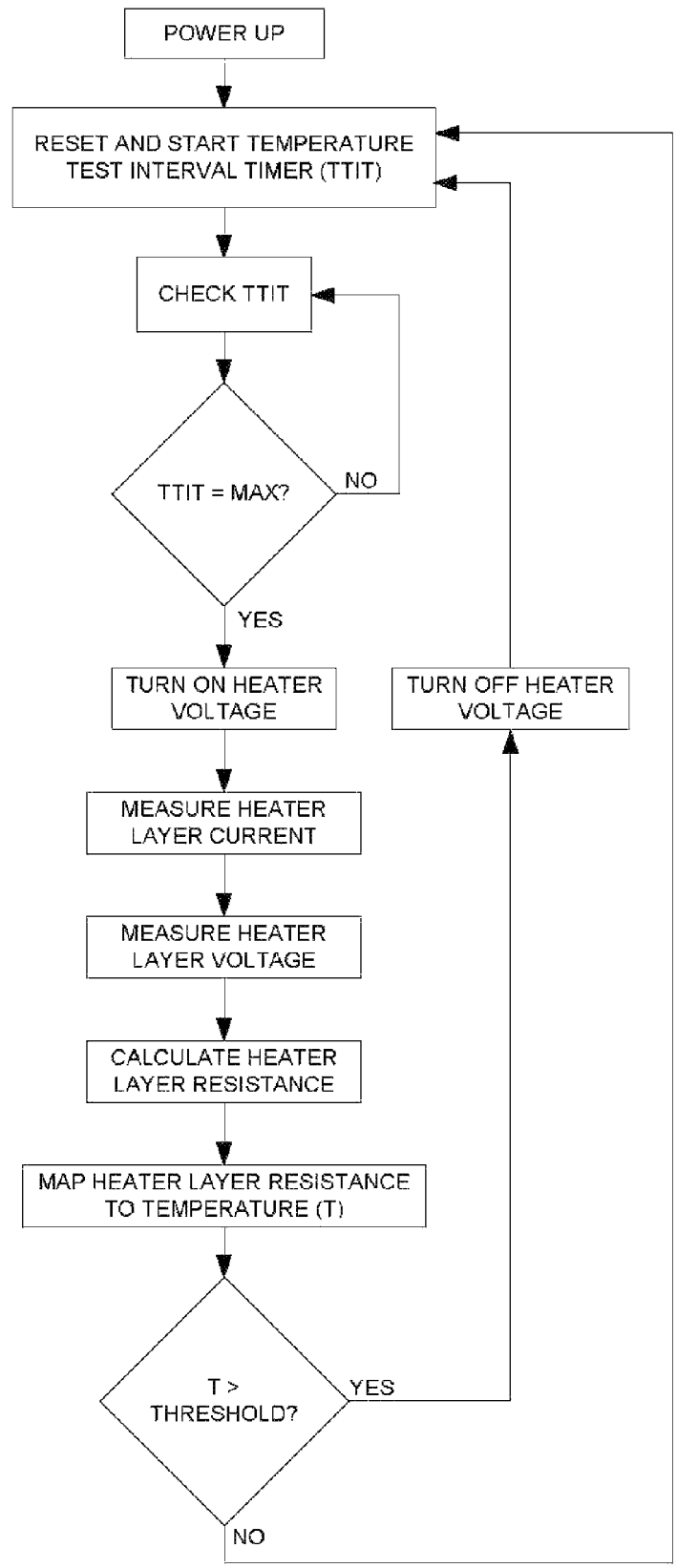
FIG. 3 depicts an exemplary embodiment of an algorithm's operational steps for controlling an integral metal heater layer using the resistance of the layer to determine temperature.

The sequence of FIG. 3 may begin at the top of the flow chart by powering up and starting a preset timer. The algorithm may provide that after the timer interval has been reached; the heater layer is then turned on. Upon turning on the heater power, the current across the heater layer is measured, followed by measuring the voltage across the heater layer. The algorithm may then measure the temperature of the heater layer via measuring the heater layer resistance and correlating the resistance to the temperature by means of the predetermined relationship. The algorithm may then either keep the heater layer powered on if the measured temperature is below a threshold value or quickly turn the heater layer off if the measured temperature is above a predetermined threshold value. Whichever decision is made—either to turn the heater voltage off or to have the voltage remain on—the preset timer may then reset to begin the sequence from that point anew.

Alternatively, the algorithm represented in FIG. 3 may include a function wherein the system provides incremental temperature changes, based on the temperature as measured by the present method. Rather than simply engaging and disengaging the heater layer, the algorithm may provide for voltage increases or decreases in the heater layer based upon the difference between the heater's present temperature and the desired temperature. This alternative method provides that the amount of power provided to the heater is proportional to the desired change in temperature and may increase the overall efficiency of the heater system.

Having shown and described exemplary embodiments, those skilled in the art will realize that many variations and modifications may be made within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

The invention claimed is:

1. A method for accurately determining and controlling the temperature of liquid crystals in an electronic display comprising:
   providing an electronic display comprising a TFT array;
   providing a metal heater layer integral to the TFT array of said electronic display;
   determining the relationship between a resistance of the metal heater layer and a temperature of the metal heater layer;
   initiating a temperature test interval;
   turning on a heater layer voltage with a heater layer current;
   measuring the heater layer voltage and heater layer current;
   determining a heater layer resistance;
   matching the heater layer resistance to a heater layer temperature via the relationship; and
   comparing the heater layer temperature with a threshold temperature, if the heater layer temperature is above the threshold temperature, turning off the heater layer voltage and reinitiating the temperature test interval, and if the heater layer temperature is below the threshold temperature, reinitiating the temperature test interval.

2. The method of claim 1, wherein the power flow to the metal heater layer is kept on so long as the heater layer temperature is below a threshold value.

3. The method of claim 1, wherein when the heater layer temperature is above the threshold value; power flow to the metal heater layer is turned off for a predetermined amount of time.

4. The method of claim 1, wherein when the heater layer temperature is below the threshold value; power flow to the metal heater layer is increased in proportion to the difference between the heater layer temperature and the threshold temperature.

5. The method of claim 1, wherein said metal heater layer is patterned onto said TFT array layer.

6. The method of claim 5, wherein said metal heater layer is comprised of a grid of intersecting horizontal and vertical lines of a conductive material.

7. The method of claim 6, wherein the conductive material is ITO.

8. The method of claim 7, wherein the resistance of the metal heater layer is determined at the time of manufacture.

9. The method of claim 8 wherein the resistance of the metal heater layer is correlated to the ambient temperature at the time of manufacture.

10. The method of claim 9, wherein the relationship between the resistance of the metal heater layer and the ambient temperature at the time of manufacture is stored in non-volatile memory.

11. The method of claim 10, wherein the relationship between the resistance of the metal heater layer and the ambient temperature at the time of manufacture is used to calibrate the relationship between the resistance of the metal heater layer and the temperature of the metal heater layer.

12. The method of claim 1, wherein the resistance value of the metal heater layer, determined at the time of manufacture, and the ambient temperature at the time of manufacture are correlated to establish an ordinal intersect for temperature determination.

13. The method of claim 12, wherein the value of the ordinal intersect is stored in non-volatile memory during assembly of the display.

14. The method of claim 13, wherein the resistance of the metal heater layer is determined after manufacture and, using the known relationship between the resistance and the temperature of the metal heater layer, determining the present temperature of the liquid crystal.

15. The method of claim 14, wherein when the heater layer temperature is below the threshold value; power flow to the metal heater layer is increased in proportion to the difference between the heater layer temperature and the threshold temperature.

16. The method of claim 14, wherein the power flow to the metal heater layer is kept on so long as the heater layer temperature is below the threshold value.

17. The method of claim 16, wherein when the heater layer temperature is above the threshold value; power flow to the metal heater layer is turned off for a predetermined amount of time.

18. A method for accurately determining and controlling the temperature of liquid crystals in an electronic display comprising:

providing an electronic display comprising a TFT array;

providing a metal heater layer integral to and contiguous with the TFT array of said electronic display;

determining the relationship between a resistance of the metal heater layer and a temperature of the metal heater layer;

measuring a resistance across the metal heater layer and using the known relationship between the temperature and the resistance of said metal heater layer to determine the temperature of the metal heater layer;

allowing power to the metal heater layer to remain on so long as the temperature of the metal heater layer is below a threshold value; and turning off the power to the metal heater layer when the temperature of the metal heater layer rises above said threshold value.

* * * * *